United States Patent [19]

Southall

[11] 4,077,876
[45] Mar. 7, 1978

[54] SHUT-OFF VALVE APPARATUS

[75] Inventor: Kenneth Southall, Wethersfield, Conn.

[73] Assignee: AMF Incorporated, White Plains, N.Y.

[21] Appl. No.: 734,570

[22] Filed: Oct. 21, 1976

Related U.S. Application Data

[63] Continuation-in-part of Ser. No. 648,987, Jan. 14, 1976, abandoned.

[51] Int. Cl.² .............................................. B01D 27/10
[52] U.S. Cl. ..................................... 210/136; 210/235
[58] Field of Search ............... 210/439, 136, 232, 234, 210/235, 282, 288, 443, 444, 446, 448, 452

[56]   References Cited
       U.S. PATENT DOCUMENTS

| | | | |
|---|---|---|---|
| 2,431,782 | 12/1947 | Walton et al. | 210/234 |
| 2,894,630 | 7/1959 | Humbert, Jr. | 210/136 |
| 2,932,400 | 4/1960 | Scavuzzo | 210/235 |
| 2,945,591 | 7/1960 | Pall | 210/234 |
| 3,040,894 | 6/1962 | Pall | 210/235 X |
| 3,715,032 | 2/1973 | Nicko | 210/235 |
| 3,954,624 | 5/1976 | Petrucci | 210/439 |

FOREIGN PATENT DOCUMENTS

| | | | |
|---|---|---|---|
| 262,264 | 6/1949 | Switzerland | 210/235 |
| 163,252 | 5/1921 | United Kingdom | 210/234 |

Primary Examiner—Theodore A. Granger
Attorney, Agent, or Firm—George W. Price; Charles J. Worth

[57]  ABSTRACT

The invention relates to a shut-off valve assembly for use with a filter carriage where the upper portion of the filter cartridge cooperates with the valve assembly for controlling fluid flowing into and out of the inlet and outlet port of the cartridge once the cartridge is removed from service. Cartridge removal causes the shut-off valve to automatically close fluid flow into and out of the cartridge. A valve abutment member in the shut-off assembly serves to shut off fluid inlet flow and a sealing member on a support member of assembly, serves to seal the shut-off assembly at the fluid inlet port. A ball check mounted in a retainer of assembly is biased in the downward direction during fluid shut-off.

3 Claims, 3 Drawing Figures

SHUT-OFF VALVE APPARATUS

The present invention is a continuation-in-part of my previously filed patent application entitled, Shut-Off Valve Apparatus, U.S. Ser. No. 648,987 filed Jan. 14, 1976 now abandoned. More specifically, the invention is directed to a shut-off apparatus employed in conjunction with a cartridge filter shown and disclosed in U.S. Pat. No. 3,954,624, issued May 4, 1976.

More particularly, the invention is directed to an apparatus employing a valve arrangement permitting simple and trouble free removal of the filter cartridge after it is spent.

It is well established that filter cartridges, as employed in commercial or residential applications, have a limited useful life after which such cartridge must be removed and replaced by a fresh cartridge. During this operation, it often becomes necessary to shut down the system to which the filter cartridge is connected so as to remove the cartridge without causing unnecessary drainage or flow through; for an example, in some instances an entire filter assembly must be removed, disassembled and a fresh cartridge inserted prior to placing the system back into operation.

While the prior art has disclosed valves which are operational and dependent upon the presence or absence of a filter within a housing, the mode of operation and the structure employed in executing the shut off operation employs a multiplicity of parts and adjusting members for insuring proper movement of the valve from the closed to the open position. Examples of the aforementioned are to be found in U.S. Pat. Nos. 3,363,762; 3,319,791; and 3,283,907.

Obviously, to provide a simple-to-operate and easy-to-construct apparatus for automatically shutting off the upstream and downstream fluid flow for the removal of a spent filter cartridge, particularly from a vending machine, coffee-maker, or the like, would tend to serve a most useful function.

The specific structure of the cartridge filters shown in U.S. Pat. No. 3,954,624 are based upon a single unitary cartridge filter surrounded by a housing having inlet and outlet ports at the head portion of the housing. In effect this type of structure represents a departure from the customary design employing separate removable filter media or elements and housing structure. With such prior assemblies the problems of residual fluid upon shut-off action are present and create an undesirable condition. To obviate this problem certain filter cartridges such shown in U.S. Pat. No. 3,954,635 employ a unitary construction whereby removable filter-cartridge assemblies enable the open area to shut-off and remain free of residual fluid. However, to do so, the present invention had to consider the unusual in and out portion of the one piece filter cartridge in order to provide positive and trouble free shut-off. An additional aspect necessitating further consideration in designing the present invention, results from the manner in which sealing surfaces are provided on the head portion of the filter-cartridge assembly shown in U.S. Pat. No. 3,954,624.

The prior art is exemplified in U.K. Pat. No. 163,252 and U.S. Pat. No. 2,431,782 represents the well known approach employing the filter housing as part of the shut-off assembly with inlet and outlet porting taking place in a conventional manner. The shut-off condition is attained in these prior art devices by the removal of separate filter elements through an open end of the housing, with the possibility of residual fluid emptying out of the housing to the surrounding surfaces.

The present invention on the other hand is especially suitable for cartridge-filter assemblies where the shut-off action is merely a function of the absence or presence of the cartridge-filter head acting in cooperation of in line shut-off structure particularly to the unitary cartridge-filter construction.

The principal features of the present invention are directed to a shut-off valve assembly for use with a filter cartridge having an upper portion provided with a transversely disposed fluid inlet port and a centrally disposed fluid outlet port, said upper portion being further provided with "O" ring sealing means below said inlet port and feathered sealing means surrounding said outlet port, said valve assembly being adapted to act upon fluid flow as said cartridge is removed from service, and including: a main body member; said main body being formed with recesses therein, having wall surfaces defining a receptacle for positioning valve means therein; said receptacle being further defined by fluid passage means communicating with said cartridge; said "O" ring being adapted to seal said valve means with respect to said filter cartridge by contact with said valve means at a lower portion thereof; said feathered seal being positionable with respect to said receptacle for directing fluid flow into said filter cartridge through said valve means; first biasing means operable with respect to said valve means, being disposed in abutting relationship with respect to said receptacle for maintaining positive pressure on said valve means; valve abutment means disposed beneath said receptacle and being connected thereto, said valve abutment means being movable for shutting off fluid inlet flow to said filter cartridge, from an inlet port of said valve assembly; valve assembly support means connected to said main body, being provided with sealing means thereon, for sealing said shut-off valve assembly at said valve abutment means; and a second biasing means in communication with a check valve means disposed in abutting relation with said receptacle for positioning said check valve means in a downward direction to form a sealed boundary with said receptacle, once said cartridge is withdrawn from said valve assembly.

Also within the scope of the present invention is a valve means which comprises a ball check disposed in said receptacle, said receptacle being defined by a unitary member having an outwardly extending flange adapted to abut with a corresponding mating surface provided on said valve abutment means, said flange being further adapted to provide a bearing surface for said first biasing means, for urging said receptacle in a downward direction toward said valve abutment means during fluid shut-off.

It is the main object of the present invention to overcome the defects and shortcomings of the prior art.

Another object of the present invention is to provide a filter shut-off structure assembly suitable for the operation with the cartridge filters having inlet and outlet fluid flow passages which cooperate with suitably disposed shut-off structure in said assembly.

Still another object of the present invention is to provide a valve structure for closing fluid flow at a designated point in time through the removal of a spent filter cartridge.

Other objects and advantages of the present invention will be more fully understood with respect to the accompanying specification, drawings and claims.

IN THE DRAWINGS

Figure 1:
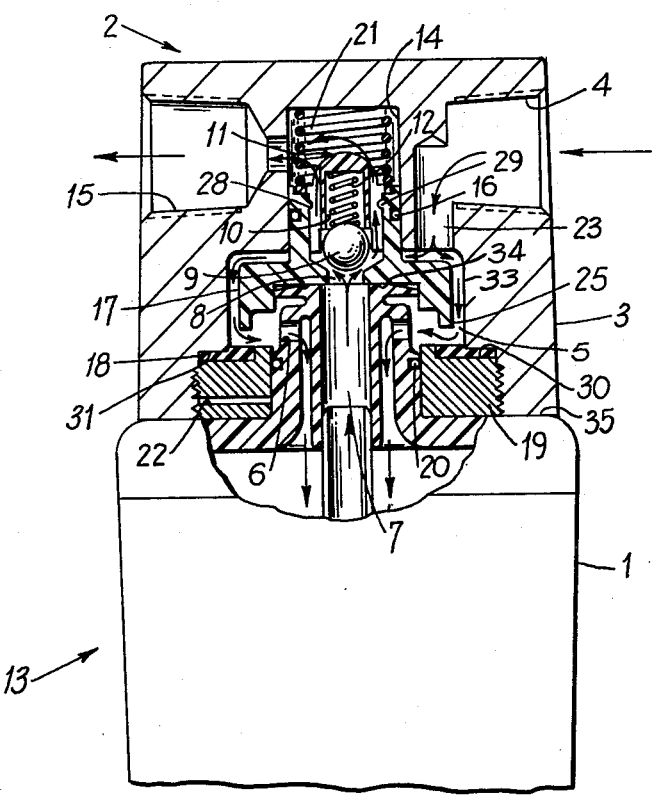
FIG. 1 is cross sectional view of the automatic shut-off assembly with a cartridge in the flow position.

According to FIG. 1, a filter cartridge 1 of the type used with the invention is disclosed in U.S. Pat. No. 3,954,624. This cartridge is adapted to cooperate with a valve assembly 2 having means described herein for automatically closing the upstream and downstream fluid flows during the removal of a spent filter cartridge 1.

The main body 3 includes a fluid inlet port 4 connected to a main chamber 5, from which the fluid flows into cartridge inlet 6. In the course of time, the effluent is passed out of the cartridge at outlet 7 into a valve chamber 8. The differential pressure between the downstream and upstream fluid causes a ball check 9 to move upwardly in passage 10 centrally disposed in ball retainer 11 located within valve chamber 8. A spring 12 is positioned above the ball check 9 in the ball retainer 11 to maintain positive pressure on the ball check 9 during shut off and to insure operation of the ball check 9 in any position of a filter assembly 13. The treated fluid flows through the ball retainer 11 into a secondary chamber 14 and through to fluid outlet 15. An "O" ring 16 positioned at the upper portion of valve 17 serves to prevent passage of the downstream fluid into secondary chamber 14, preventing by-pass of the inlet fluid to outlet 15. A main shut-off seal 18 is positioned on a main shut-off seal support 19. The main shut-off seal support 19 provides a sealing surface for the "O" ring 20, normally found on filter cartridge 1. The "O" ring 20 merely serves to keep the fluid from leaking out of the valve assembly 2. The feathered seal 33 of filter cartridge 1 in contact with valve 17 prevents by-pass of inlet fluid to the valve chamber 8 causing the fluid to pass into cartridge inlet 6 and through to filter cartridge 1. Main shut-off seal 18 acts to seal the main shut-off seal support 19 and the main body 3. The seal 18 also prevents leakage outside of the valve assembly 2 and also seals the inlet flow when the valve 17 is in the shut-off position.

The surface 34 of cartridge 1 serves as an abutment with respect to valve assembly 2 by urging valve 17 upward when the cartridge 1 is advanced to the furtherest most position in an upward direction as determined by surface 35. As a result of this action, fluid passing from fluid inlet port 4 through passage 23, flows into main chamber 5 and continues past cartridge inlet 6 and into the filter cartridge 1.

Figure 2:
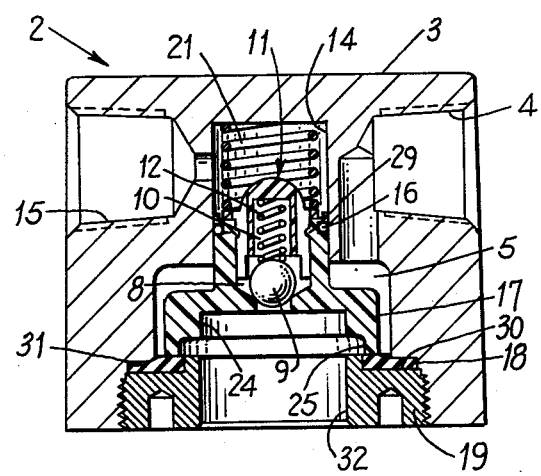
FIG. 2 is a cross section view of the automatic shut-off assembly without a cartridge, and in the nonflow position.

When the filter cartridge 1 is removed from the valve assembly 3, as per FIG. 2, a spring 21 positioned in secondary chamber 14 and acting upon ball retainer 11, forces the ball retainer 11 and valve 17 in downward direction, until valve 17 contacts seal 18 shutting off fluid flow to the cartridge 1. A more positive shut-off is obtained by the differential pressure when valve 17 is in the shut-off position. As the filter cartridge 1 gradually disengages the valve assembly 2, fluid in main chamber 5 is allowed to vent through relief hole 22 in main shut-off seal support 19. Fluid in main chamber 5 is prevented from leaking to atmosphere by the action of "O" ring 20 engaging main shut-off seal support 19 where valve 17 has closed with respect to seal 18. The aforementioned sealing action in conjunction venting through relief hole 22 prevents fluid under pressure from escaping. Once the cartridge 1 is completely disengaged, trapped fluid cannot escape from the valve assembly 2 due to the sealing action caused by a lower lip 25 on valve 17 and seal 18. No leakage occurs from the upstream fluid stream to the outside since the check ball 9 is seated on valve 17 by the action of spring 12 and back pressure.

Main body 3 has inlet port 4 and outlet port 15 in an in-line relationship, permitting easy mounting of the valve assembly 2 with respect to existing piping systems. Such an arrangement is made possible by employing a passage 23 perpendicular to the inlet port 4, thus permitting fluid flow directly from the inlet port 4 to main chamber 5.

Figure 3:
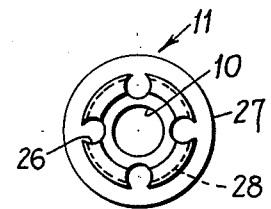
FIG. 3 is an end view of the ball retainer member of the valve assembly.

The ball retainer 11, as shown in FIG. 3, comprises a unitary member having a series of holes 26 symmetrically positioned beneath a flange 27, which flange 27 abuts valve 17 at all times, and also acts as a bearing surface for spring 21. The holes 26 permit fluid flow from passage 10 into secondary chamber 14. By means of a groove 28 on ball retainer 11 and a mating protuberance 29 on the upper surface of valve chamber 8, positive locking between valve 17 and ball retainer 11 takes place.

The main shut-off seal support 19 principally serves to retain the various elements of the valve assembly 2 within the main chamber 5 and secondary chamber 14. It further acts as a support for the main shut-off seal 18, which seal is disposed on the upper surface 30 of the support 19, enabling sealing between the support 19 and the lower surface 31 of main body 3. In the shut-off position, as the valve 17 tends in a downward direction, due the bias introduced by spring 21 on the valve 17, the support 19 and seal 18 acts as a retainer to define the maximum downward distance that valve 17 can travel. The action of valve 17 on seal 18 prevents passage of fluid out of chamber 5. The support 19 is provided with a central passage 32 for receiving the filter cartridge 1. A vent hole 22 extends from the passage 32 to the outer surface of support 19 to vent in a manner as set forth hereinabove.

Though the aforementioned structure has been described with respect to a vending machine, coffee machine, cartridge or the like, the concepts employed lend themselves to other situations where uncontrolled fluid flow from the valve is sought to be prevented when replacement takes place.

What I claim is:

1. Support and flow control means for a filter cartridge having its inlet and outlet at its same upper end, said means comprising:
a main body member with an inlet opening constructed and arranged to conduct fluid to be filtered through said main body member to the inlet of a filter cartridge when supported by said main body member, and an outlet opening constructed and arranged to conduct filtered fluid through said main body member from an outlet of a filter cartridge when supported by said main body member;
said main body member being further provided with a central opening to receive and support said upper end of a filter cartridge, and an abutment means encircling said central opening;

spring biased closure means for said inlet opening displaced to an open position by a cartridge supported by said main body member and biased to a closed position to sealingly contact said abutment means when a filter cartridge is removed from said main body member; and said closure means being provided with other means spring biased to close said outlet opening when a cartridge is removed from said main body member and to open said outlet opening in response to flow of filtered fluid from the outlet of a filter cartridge when supported by said main body member.

2. Support and flow control means in accordance with claim 1, and said main body member defining a valve chamber axially aligned with central opening and in communication with said inlet opening, outlet opening and central opening said closure means being a valve member blocking flow to said outlet opening and having an annular flange arranged to sealingly engage said abutment to block flow of fluid to be filtered from said inlet opening when a filter cartridge is removed from said main body, spring means disposed in said chamber biasing said valve member in the direction of the abutment means, and said valve member further comprising a central wall disposed within said annular flange and arranged to be engaged by said upper end of a filter cartridge supported by said main body member to move and retain said valve member and its annular flange away from said abutment means thereby permitting flow of fluid to be filtered from said inlet opening to the inlet of a filter cartridge supported by said main body.

3. Support and flow control means in accordance with claim 2, and said central wall of said valve member having a central opening therethrough aligned with the outlet of a filter cartridge when supported by said main body member;

said valve member further being provided with a ball check and a ball check biasing spring on the side of said central wall opposite from said annular flange closing said central opening in the absence of flow of filtered fluid from the outlet of a filter cartridge, and said ball check being moved against the bias of said spring and opening said central opening in response to flow of filtered fluid from the outlet of a filter-cartridge when supported by said main body member thereby passing the filtered fluid to said outlet opening.

* * * * *